July 14, 1925.

A. T. POTTER

WEATHER STRIP

Filed April 28, 1924

1,545,694

Inventor
Albert T. Potter

By Whittemore, Hulbert, Whittemore
     & Belknap        Attorneys

Patented July 14, 1925.

1,545,694

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WEATHER STRIP.

Application filed April 28, 1924. Serial No. 709,523.

*To all whom it may concern:*

Be it known that I, ALBERT T. POTTER, a citizen of the United States of America, residing at Detroit, in the county of Wayne and State of Michigan, have invented certain new and useful Improvements in Weather Strips, of which the following is a specification, reference being had therein to the accompanying drawings.

This invention relates generally to weather strips designed for sealing the joints between the panel sections of windshields and consists of certain novel features of construction as will be more fully described and particularly pointed out in the appended claims.

Figure 1:
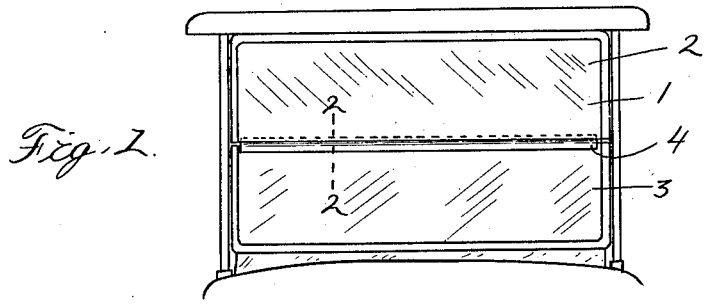
Figure 1 is a front elevation of a vehicle windshield and showing a weather strip embodying my invention applied thereto.

Heretofore the joints between the opposing edges of the spaced panels or sections of windshields have been sealed by means of resilient channel-shaped strips that have been attached to the upper edges of the lower panels and that have been provided with abutment flanges only for engagement with the inner faces of the upper panels. However, such constructions have proven objectionable for the reason that water, dust, etc. oftentimes finds its way between the lower edge of the upper panel and the base of the strip and between the inner side of the upper panel and the single abutment flange, and, as a result, falls upon the occupants of the vehicle.

With the present invention the objectionable features referred to are entirely overcome for the reason that the space between the base or web of the strip and the lower edge of the upper panel is closed by an additional flange that projects upwardly from the outer edge of the strip and is bent inwardly against the lower edge of the upper panel when the latter is closed, thereby cooperating with the upper panel and the usual abutment flange to provide a tight weather joint.

As shown in the drawing, the numeral 1 designates a windshield, preferably of a motor vehicle, having spaced pivotally mounted glass panels 2 and 3 respectively.

For sealing the joint between the glass panels, I preferably provide a resilient weather strip 4 which has a web portion 5 and the marginal depending and upstanding converging flanges 6 and 7 respectively. As shown, the web 5 is preferably held in position upon the upper edge of the lower panel 3 by means of the depending flanges 6 which grip the opposite sides of the lower panel, while the inner upstanding flange 7 preferably serves as an abutment for the inner face of the upper panel 2 when closed.

Figures 2, 3:
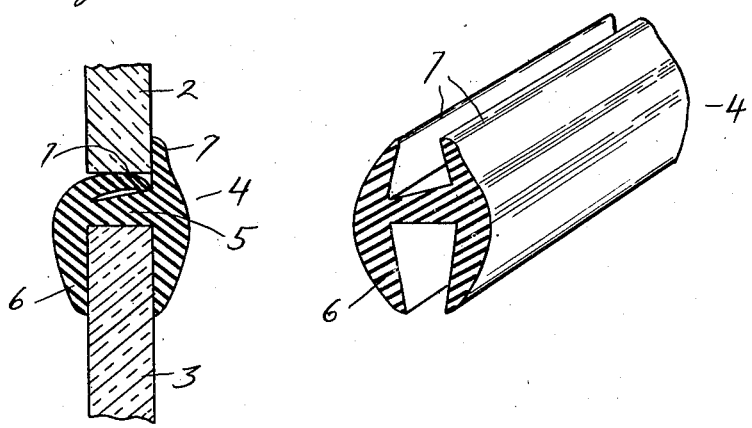
Figure 2 is a sectional view taken on line 2—2 of Figure 1.
Figure 3 is a perspective view of the strip.

In order that the joint between the panels of the windshield may be sealed without affecting the swinging movement of the upper panel the outer upstanding flange 7 is preferably relatively thin so that it may be bent readily over the web 5 of the strip as shown in Figure 2 of the drawing. Thus, when the upper panel 2 is swung inwardly to closed position, the lower edge thereof will bend the outer flange 7 inwardly and will hold the latter in bent over position, while the inner face of the upper panel will bear against the inner flange 7, thereby forming a double seal to prevent the passage of water, dust, etc. inwardly between the panels. To provide a more effective seal between the weather strip and the lower edge of the upper panel when the latter is in closed position, the upper face of the web is preferably inclined as shown at 8 to form a raised bearing for the outer flange 7 when it is bent over the web.

What I claim as my invention is:

1. The combination with a windshield having spaced panel sections, of means for sealing the joint between the panel sections, said means including a resilient strip having a web secured to an edge of one section and having a yieldable flange adapted to be bent over the web by the cooperating section to close the space between the strip and the edge of the cooperating panel section, said web also having an abutment flange engageable by one side of said cooperating section.

2. The combination with a windshield having spaced upper and lower panel sections, of means for sealing the joint between said panel sections, said means including a strip having a web engageable with the upper edge of the lower panel section, depending flanges carried by the web embracing opposite sides of the lower panel section for holding the web in position thereon, a flange carried by the web adapted to be bent over the web by the upper panel section whereby the outer face of the flange will bear against the adjacent edge of the upper panel to close the space between the web and the lower edge of the upper panel section, and an abutment flange projecting upwardly from the web engageable by the inner side of the upper panel section.

3. The combination with a windshield having spaced upper and lower panel sections, of means for sealing the joint between the panel sections, said means including a resilient strip having a web engageable with an edge of the lower panel section, flanges projecting from the web embracing opposite sides of said lower panel section to secure the web in position thereon, and a yieldable flange carried by the web adapted to be bent over the web by the upper panel section to close the space between the strip and the lower edge of the upper panel section, said web having an inclined upper surface forming a raised bearing for the bentover flange.

4. The combination with a windshield having spaced panel sections, of means for sealing the joint between the panel sections, said means including a strip of substantially H-shape in cross section, the depending flanges of the H embracing opposite sides of one panel section, one of the upstanding flanges of the H being engageable by one side of the cooperating panel section, the other upstanding flange of the H being adapted to be bent over the intermediate web of the H by the cooperating panel section to close the space between the web and the edge of the cooperating panel section.

5. The combination with a windshield having spaced panel sections, of means for sealing the joint between the panel sections including a strip having a web mounted on an edge of one panel section, flanges projecting from the web engaging the said section for holding the strip thereon, an abutment flange for the other panel section projecting from the web, and a sealing flange projecting from the web adapted to be bent over the web for closing the space between the latter and the edge of the last mentioned panel section, said web progressively increasing in thickness from the sealing flange to the abutment flange to provide an inclined bearing for the sealing flange when in bent position.

In testimony whereof I affix my signature.

ALBERT T. POTTER.